United States Patent
Miyashita et al.

(10) Patent No.: US 11,834,572 B2
(45) Date of Patent: Dec. 5, 2023

(54) POLYVINYLIDENE FLUORIDE RESIN COMPOSITION AND MOLDED ARTICLE

(71) Applicant: Kureha Corporation, Tokyo (JP)

(72) Inventors: Tatsuaki Miyashita, Tokyo (JP); Kazuyuki Suzuki, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 148 days.

(21) Appl. No.: 17/309,864

(22) PCT Filed: Oct. 17, 2019

(86) PCT No.: PCT/JP2019/040818
§ 371 (c)(1),
(2) Date: Jun. 24, 2021

(87) PCT Pub. No.: WO2020/137108
PCT Pub. Date: Jul. 2, 2020

(65) Prior Publication Data
US 2022/0064426 A1  Mar. 3, 2022

(30) Foreign Application Priority Data
Dec. 27, 2018 (JP) ................. 2018-245944

(51) Int. Cl.
C08L 27/16 (2006.01)
C08K 5/42 (2006.01)
C08K 5/19 (2006.01)

(52) U.S. Cl.
CPC ............... *C08L 27/16* (2013.01); *C08K 5/19* (2013.01); *C08K 5/42* (2013.01); *C08L 2201/10* (2013.01)

(58) Field of Classification Search
CPC .................. C08L 27/16; C08K 5/42
See application file for complete search history.

(56) References Cited

U.S. PATENT DOCUMENTS

| | | | |
|---|---|---|---|
| 6,610,766 B1 | 8/2003 | Kitamura et al. | |
| 6,846,436 B1 | 1/2005 | Kitamura et al. | |
| 9,029,453 B2 * | 5/2015 | Hidaka | C08J 5/18 524/381 |
| 2016/0215120 A1 | 7/2016 | Henry | |
| 2017/0096553 A1 | 4/2017 | Ikawa et al. | |
| 2017/0145183 A1 | 5/2017 | Hebrink | |
| 2017/0232717 A1 | 8/2017 | Sanefuji et al. | |
| 2018/0208758 A1 | 7/2018 | Hiraoka et al. | |

FOREIGN PATENT DOCUMENTS

| | | | |
|---|---|---|---|
| CN | 1350566 A | 5/2002 | |
| CN | 105683223 A | 6/2016 | |
| CN | 106459545 A | 2/2017 | |
| CN | 107001752 A | 8/2017 | |
| CN | 107073909 A | 8/2017 | |
| CN | 107443700 A | 12/2017 | |
| EP | 942038 A1 | 9/1999 | |
| EP | 3052533 A1 | 8/2016 | |
| EP | 3157988 A1 | 4/2017 | |
| EP | 3181355 A1 | 6/2017 | |
| EP | 3 904 452 A1 | 11/2021 | |
| JP | 8-295776 A | 11/1996 | |
| JP | 11-323052 A | 11/1999 | |
| JP | 2003281932 A * | 10/2003 | .......... H01M 10/052 |
| JP | 2005-350621 A | 12/2005 | |
| JP | 2013-185140 A | 9/2013 | |
| JP | 2016-531964 A | 10/2016 | |
| JP | 2017-519868 A | 7/2017 | |
| JP | 2017-213883 A | 12/2017 | |
| JP | 2018-138674 A | 9/2018 | |
| JP | 2019-43144 A | 3/2019 | |
| KR | 10-2017-0023958 A | 3/2017 | |
| KR | 10-2017-0041841 A | 4/2017 | |
| KR | 10-2017-0089916 A | 8/2017 | |
| KR | 10-2017-0135720 A | 12/2017 | |
| SG | 11201610566 S | 1/2017 | |
| SG | 10201806476 W | 8/2018 | |
| TW | 201627385 A | 8/2016 | |
| TW | 201819512 A | 6/2018 | |
| WO | 2015/048697 A1 | 4/2015 | |
| WO | 2015/195334 A1 | 12/2015 | |
| WO | 2016/024592 A1 | 2/2016 | |
| WO | 2016/088667 A1 | 6/2016 | |

OTHER PUBLICATIONS

Extended European Search Report for European Application No. 19904940.4, dated Feb. 11, 2022.
Office Action dated Apr. 19, 2022, in Japanese Patent Application No. 2018-245944.
Office Action dated Jun. 10, 2022, in Chinese Patent Application No. 201980083154.2.
English translation of International Search Report and Written Opinion dated Jul. 8, 2021, in PCT/JP2019/040818.
Japanese Office Action for Japanese Application No. 2018-245944, dated Aug. 30, 2022, with a English translation.

* cited by examiner

*Primary Examiner* — Vickey Nerangis
(74) *Attorney, Agent, or Firm* — Birch, Stewart, Kolasch & Birch, LLP

(57) ABSTRACT

A polyvinylidene fluoride resin composition of the present invention contains an alkyl quaternary ammonium sulfate, an alkali metal concentration in the polyvinylidene fluoride resin composition is 60 ppm or less, and a hydrogen fluoride concentration in the polyvinylidene fluoride is 5 ppm or less. The polyvinylidene fluoride resin composition of the present invention can express sufficient transparency even in a thick molded article.

6 Claims, No Drawings

POLYVINYLIDENE FLUORIDE RESIN COMPOSITION AND MOLDED ARTICLE

TECHNICAL FIELD

The present invention relates to a polyvinylidene fluoride resin composition and a molded article.

BACKGROUND ART

Vinylidene fluoride resins are used in various fields because they exhibit high strength, chemical resistance, heat resistance, and ferroelectric properties. In addition, Patent Document 1 discloses a polyvinylidene fluoride resin composition containing an alkyl quaternary ammonium sulfate or an alkyl quaternary ammonium sulfite in a polyvinylidene fluoride resin, which is shown to have excellent transparency. It has been found that excellent transparency further expands the field of use of vinylidene fluoride resins, such as application to optical members.

CITATION LIST

Patent Document

Patent Document 1: JP 11-323052 A

SUMMARY OF INVENTION

Technical Problem

However, in the related art described above, sufficient transparency may not be ensured when a thick molded article is produced.

An object of an aspect of the present invention is to realize a resin composition capable of expressing sufficient transparency even in a thick molded article.

Solution to Problem

In order to solve the problem described above, a polyvinylidene fluoride resin composition according to an aspect of the present invention is a polyvinylidene fluoride resin composition containing a polyvinylidene fluoride, the polyvinylidene fluoride resin composition containing an alkyl quaternary ammonium sulfate, an alkali metal concentration in the polyvinylidene fluoride resin composition being 60 ppm or less, and
a hydrogen fluoride concentration in the polyvinylidene fluoride being 5 ppm or less.

Advantageous Effects of Invention

According to an aspect of the present invention, it is possible to provide a resin composition capable of expressing sufficient transparency even in a thick molded article.

DESCRIPTION OF EMBODIMENTS

[Polyvinylidene Fluoride Resin Composition]

A polyvinylidene fluoride resin composition according to the present embodiment (hereinafter, sometimes abbreviated simply as "resin composition") contains a polyvinylidene fluoride and an alkyl quaternary ammonium sulfate. It is thought that an ionic interaction between a polyvinylidene fluoride and an alkyl quaternary ammonium sulfate can impart transparency to a molded article. From the perspective of ease of handling and ease of molding, the resin composition is preferably granulated into a powder, pellets, or the like.

(Polyvinylidene Fluoride)

The polyvinylidene fluoride in the present embodiment is a polymer containing vinylidene fluoride as a main component. The phrase "containing vinylidene fluoride as a main component" mentions that the polyvinylidene fluoride contains 50 mol % or greater of constituent units derived from vinylidene fluoride. The polyvinylidene fluoride may be a homopolymer of vinylidene fluoride containing substantially 100 mol % of constituent units derived from vinylidene fluoride, or may be a copolymer of vinylidene fluoride further including constituent units derived from other monomers.

One type of other monomers may be used, or two or more types may be used. Other monomers may or does not have to contain fluorine. Examples of other monomers include tetrafluoroethylene, trifluoroethylene, chlorotrifluoroethylene, hexafluoropropene, vinyl fluoride, 2,3,3,3-tetrafluoropropene, pentafluoropropene, perfluoromethyl vinyl ether, perfluoropropyl vinyl ether, and (meth)acrylic acid esters such as methyl (meth)acrylate and butyl (meth)acrylate.

Into the polyvinylidene fluoride, hydrogen fluoride that may be generated in a production process may be mixed. A hydrogen fluoride concentration in the polyvinylidene fluoride in the present embodiment is 5 ppm or less. It is thought that when the hydrogen fluoride concentration exceeds the range described above, the alkyl quaternary ammonium sulfate and the hydrogen fluoride react to consume the alkyl quaternary ammonium sulfate that contributes to transparency, thereby deteriorating the transparency of the molded article. From the perspective of ensuring sufficient transparency of the molded article, the hydrogen fluoride concentration in the polyvinylidene fluoride is preferably 2 ppm or less, and more preferably 1 ppm or less.

The hydrogen fluoride concentration in the polyvinylidene fluoride can be measured, for example, by a method described in Examples described later. Specifically, a predetermined solution is added to the polyvinylidene fluoride and the resulting solution is left to stand at room temperature for a predetermined period of time. Fluoride ions ($F^-$) that have flowed out into the solution are then quantified by ion chromatography. Then, the hydrogen fluoride concentration can be obtained by concentration of fluoride ions in the solution×weight of the solution/weight of the polyvinylidene fluoride.

From the perspective of ensuring sufficient transparency of the molded article, the polyvinylidene fluoride is preferably a homopolymer of vinylidene fluoride having a low alkali metal concentration and a low hydrogen fluoride concentration. Furthermore, use of a homopolymer of vinylidene fluoride can impart contamination resistance, ozone resistance, and solvent resistance to the molded article.

A molecular weight of the polyvinylidene fluoride can be appropriately determined in accordance with intended physical properties of the molded article. The molecular weight of the polyvinylidene fluoride can be represented by an inherent viscosity, and can be appropriately determined in a range from 0.8 to 2.0 dL/g, for example. The inherent viscosity of the polyvinylidene fluoride is preferably from 0.8 to 2.0 dL/g, from the perspective of processability, for example. The inherent viscosity is a logarithmic viscosity at 30° C. of a solution obtained by dissolving 4 g of the polyvinylidene fluoride in 1 liter of N,N-dimethylformamide.

The polyvinylidene fluoride can be produced by a known method, and can be produced by solution polymerization, emulsion polymerization, or suspension polymerization, for example.

(Alkyl Quaternary Ammonium Sulfate)

The alkyl quaternary ammonium sulfate in the present embodiment is a compound represented by Formula (1):

[Chem. 1]

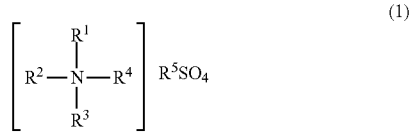

(1)

In Formula (1), $R^1$ to $R^4$ are the same or different alkyl groups having 1 to 10 carbon atoms. Examples of the alkyl group include short-chain alkyl groups such as a methyl group, an ethyl group, a propyl group, a butyl group, a pentyl group, a hexyl group, a heptyl group, and an octyl group. From the perspective of ensuring sufficient transparency of the molded article, the total number of carbon atoms in the alkyl groups in the $R^1$ to $R^4$ is preferably from 6 to 30, more preferably from 6 to 24, and particularly preferably from 8 to 20.

In Formula (1), $R^5$ is an alkyl group, a fluoroalkyl group, or a hydrogen atom. The alkyl group in $R^5$ is a short-chain alkyl group having from 1 to 10 carbon atoms, such as a methyl group or an ethyl group. The fluoroalkyl group in $R^5$ is a short-chain fluoroalkyl group having from 1 to 10 carbon atoms such as $CF_3$ or $C_2F_5$. Among these, $R^5$ is preferably hydrogen.

Specific examples of these include salts formed from alkyl quaternary ammonium cations such as $(C_2H_5)_4N^+$, $(C_3H_7)_4N^+$, $(C_4H_9)_4N^+$, and $(C_5H_{11})_4N^+$, and anions such as $CF_3SO_4^-$, $CH_3SO_4^-$, and $HSO_4^-$. These compounds may be respectively used alone or in combinations of two or more types.

The alkyl quaternary ammonium sulfate in the present embodiment is preferably an alkyl quaternary ammonium hydrogen sulfate from the perspective of ensuring sufficient transparency of the molded article. Examples of the alkyl quaternary ammonium hydrogen sulfate include tetraethylammonium hydrogen sulfate, tetrapropylammonium hydrogen sulfate, tetrabutylammonium hydrogen sulfate, tetrapentylammonium hydrogen sulfate, and tetrahexylammonium hydrogen sulfate. Among the alkyl quaternary ammonium hydrogen sulfates, tetraethylammonium hydrogen sulfate, tetrapropylammonium hydrogen sulfate, or tetrabutylammonium hydrogen sulfate is preferred from the perspective of ensuring sufficient transparency and strength of the molded article. These compounds may be respectively used alone or in combinations of two or more types.

From the perspective of ensuring sufficient transparency and strength of the molded article, a proportion of the alkyl quaternary ammonium sulfate is preferably from 0.3 to 10 parts by weight, more preferably from 0.8 to 5 parts by weight, and even more preferably from 0.8 to 1.3 parts by weight per 100 parts by weight of the polyvinylidene fluoride according to the present embodiment.

(Crystal Melting Enthalpy of Resin Composition)

In the resin composition according to the present embodiment, a crystal melting enthalpy measured by a differential scanning calorimeter is preferably 40 J/g or greater, more preferably 45 J/g or greater, and even more preferably 50 J/g or greater. In addition, the crystal melting enthalpy is preferably 80 J/g or less, more preferably 75 J/g or less, and even more preferably 70 J/g or less. When the crystal melting enthalpy is within the range described above, it is possible to impart sufficient mechanical strength, gas barrier properties, transparency, and the like to the molded article.

(Alkali Metal Concentration in Resin Composition)

An alkali metal contained in a polymerization reaction system of the polyvinylidene fluoride may remain in the resin composition according to the present embodiment. The alkali metal concentration in the resin composition according to the present embodiment is 60 ppm or less. It is thought that when the alkali metal concentration exceeds the range described above, the ionic interaction between the alkyl quaternary ammonium sulfate and the polyvinylidene fluoride is inhibited, thereby deteriorating the transparency of the molded article. Examples of the alkali metal include potassium and sodium. From the perspective of ensuring sufficient transparency of the molded article, the alkali metal concentration in the resin composition is preferably 10 ppm or less and more preferably 5 ppm or less.

The alkali metal concentration in the resin composition can be measured by, for example, the method described in Examples described later. Specifically, the resin composition is heated and subjected to ashing. The composition subjected to ashing is then dissolved in an acid and measured by inductively coupled plasma emission spectroscopy (ICP-AES), whereby the alkali metal concentration can be obtained.

(Other Components)

The resin composition according to the present embodiment may further contain other components in a range where the effects of the present embodiment can be provided. One type of the other components may be used, or two or more types may be used. A content of additives in the resin composition can be appropriately determined as long as both the effects of the present embodiment and the effects of the additives are provided. Examples of other components described above include additives and polymers other than the polymers described above. Examples of the additives include a thermal stabilizer, an UV absorber, a photostabilizer, a lubricant, a plasticizer, a bluing agent, and an anti-coloration agent.

(Method for Producing Resin Composition)

As a method for producing the resin composition according to the present embodiment, for example, the resin composition can be obtained by mixing powder or pellets of the polyvinylidene fluoride and the alkyl quaternary ammonium sulfate.

Examples of a device that mixes the materials of the resin composition include a Henschel blender, a cylindrical mixer, a screw type mixer, a screw type extruder, a turbulizer, a Nauta mixer, a V-shaped mixer, a ribbon mixer, a twin arm kneader, a flow mixer, an air flow mixer, a rotating disc mixer, a roll mixer, a rolling mixer, and a Loedige mixer.

Furthermore, the mixture of the polyvinylidene fluoride and the alkyl quaternary ammonium sulfate is dried and the resulting dried product is melt-extruded, whereby a pellet-shaped resin composition can be obtained.

Examples of the extruder include a single screw extruder, a co-axial twin screw extruder, and an anisotropic twin screw extruder.

[Molded Article]

The molded article according to the present embodiment is a molded article having a thickness of 1 mm or greater that is molded from the resin composition described above. The shape of the molded article can be appropriately determined as long as the molding mentioned below is feasible. The thickness of the molded article may be the average value of the thicknesses at an appropriate number of points in the thinnest portion of the molded article.

Furthermore, the molded article according to the present embodiment is molded from a polyvinylidene fluoride resin composition containing a polyvinylidene fluoride and an alkyl quaternary ammonium sulfate, the polyvinylidene fluoride is a homopolymer of vinylidene fluoride, and an alkali metal concentration in the polyvinylidene fluoride resin composition may be 60 ppm or less.

In addition, the molded article according to the present embodiment has a haze of 25% or less. The phrase "the molded article has a haze of 25% or less" means that the haze value is at most 25% when the molded article has a thickness of 2 mm. That is, the molded article according to the present embodiment is formed using the resin composition described above, and thus the haze is suppressed to 25% or less even with the thickness of 2 mm. The haze of the molded article can be measured by a known method such as a commercially available haze meter, for example. The haze of the molded article may be, for example, a measured haze value measured at any portion of the molded article, or may be a calculated value which is calculated as the haze of a portion having a thickness of 2 mm from the measured haze value of a portion having a thickness greater than 2 mm or less than 2 mm.

(Optional Components)

The molded article of the present embodiment may further include other components as long as the effects of the present embodiment can be provided.

[Method for Producing Molded Article]

The molded article according to the present embodiment can be produced by a known method such as injection molding or press molding, calendar molding, extrusion molding, or melt spinning, in the same manner as the production of a known molded product of polyvinylidene fluoride.

Furthermore, the production method can be selected in accordance with a desired shape of the molded article.

The form of the resin composition to be subjected to production of the molded article is only required to be applicable to the molding method. Such a form is, for example, a powder, but may be a pellet, a flake, a compression molded product of a powder, or a molded product to be accommodated in a mold. In the production of the molded article, the resin composition is heated to be melted at a temperature at which the resin composition melts sufficiently, and molded.

(Injection Molding)

Injection molding is, for example, a method in which a resin composition is supplied to an injection molding machine, melted by heating, poured into a mold, injected, and gradually cooled to obtain a molded article.

(Press Molding)

Press molding is generally a method in which a resin composition is accommodated in a mold and subjected to hot pressing using a compression molding machine (e.g., 3 minutes at 230° C., 5 MPa pressure), followed by cold pressing (e.g., 3 minutes at 30° C.) to obtain a molded article.

The mold used in the press molding is only required to be a member that can be used for heating and pressurization and can hold the molten resin composition in a shape to be molded. Examples of such molds include metal molds and metal sheets such as aluminum foil.

In a case where the shape of the molded article in the present embodiment is a sheet shape, the molten resin composition is preferably pressurized from the perspective of achieving a uniform thickness and a smooth surface of the molded article, in addition to the aforementioned perspective of sufficiently dense filling. That is, preferably, in the press molding, the resin composition is pressed by a press member and formed into a sheet shape while the resin composition is melted by heating the press member. The press member is only required to be a known member capable of implementing the aforementioned heating and pressurization.

The pressure of the cold pressing may be the same as or different from that of the hot pressing. The temperature and time of the cold pressing may be determined as appropriate. For example, the temperature is 5° C. or higher and 40° C. or lower, and the time is 2 minutes or longer and 10 minutes or shorter.

(Other Steps)

The method for producing the molded article may further include other steps as long as the effects of the present embodiment can be obtained. Examples of such other steps include a preheating step of preheating the mold prior to molding, a molded product making step of making a molded product of the resin composition in the mold, a gradual cooling step of gradually cooling the molded product after heating, pressurizing, and molding, and an annealing step of annealing the resulting molded article.

(Shape of Molded Article)

The shape of the molded article obtained by the production method described above varies and is not particularly limited. Examples of the shape of the obtained molded article include injection molded articles, pipe shapes, round bars, square bars, sheet shapes, film shapes, and fibers.

SUMMARY

The polyvinylidene fluoride resin composition according to the present embodiment is a polyvinylidene fluoride resin composition containing a polyvinylidene fluoride, the polyvinylidene fluoride resin composition containing an alkyl quaternary ammonium sulfate, an alkali metal concentration in the polyvinylidene fluoride resin composition being 60 ppm or less, and a hydrogen fluoride concentration in the polyvinylidene fluoride being 5 ppm or less.

Furthermore, in the polyvinylidene fluoride resin composition according to the present embodiment, the crystal melting enthalpy measured by a differential scanning calorimeter is preferably 40 J/g or greater and 80 J/g or less.

Furthermore, in the polyvinylidene fluoride resin composition according to the present embodiment, the polyvinylidene fluoride is preferably a homopolymer of vinylidene fluoride.

Furthermore, in the polyvinylidene fluoride resin composition according to the present embodiment, the alkyl quaternary ammonium sulfate is preferably an alkyl quaternary ammonium hydrogen sulfate.

Furthermore, in the polyvinylidene fluoride resin composition according to the present embodiment, the alkyl quaternary ammonium hydrogen sulfate is at least one selected from tetraethylammonium hydrogen sulfate, tetrapropylammonium hydrogen sulfate, and tetrabutylammonium hydrogen sulfate.

Furthermore, in the polyvinylidene fluoride resin composition according to the present embodiment, the hydrogen fluoride concentration is preferably 1 ppm or less.

Furthermore, the molded article according to the present embodiment is a molded article having a thickness of 1 mm or greater, and is molded from the polyvinylidene fluoride resin composition, and the haze of the molded article is 25% or less.

Furthermore, the molded article according to the present embodiment is a molded article having a thickness of 1 mm or greater, and is molded from a polyvinylidene fluoride resin composition containing a polyvinylidene fluoride and an alkyl quaternary ammonium sulfate, in which the polyvinylidene fluoride is a homopolymer of vinylidene fluoride, the alkali metal concentration in the polyvinylidene fluoride resin composition is 60 ppm or less, and the haze of the molded article is 25% or less.

Examples are presented below to describe embodiments of the present invention in further detail. The present invention is not limited to Examples below, and it goes without saying that various aspects are possible with regard to the details thereof. Furthermore, the present invention is not limited to the embodiments described above, and various modifications are possible within the scope indicated in the claims. Embodiments obtained by appropriately combining the technical means disclosed by the embodiments are also included in the technical scope of the present invention. In addition, all documents described in the present specification are incorporated by reference.

EXAMPLES

Example 1

To 100 parts by weight of a polyvinylidene fluoride, an alkyl quaternary ammonium sulfate was added so as to be 1.0 part by weight. Then, the mixture was extruded at a cylinder temperature of 190° C. using a co-axial twin screw extruder (TEM-26, available from Toshiba Machine Co., Ltd.) to obtain a pellet-shaped polyvinylidene fluoride resin composition.

A polyvinylidene fluoride (hereinafter, abbreviated as Polymer A) that is a powdery homopolymer was used as the polyvinylidene fluoride (hereinafter, sometimes abbreviated as "raw material 1"). Polymer A was produced under the same conditions as Example 4 of JP 5274774 B.

Furthermore, tetrabutylammonium hydrogen sulfate (available from Koei Chemical CO., Ltd., hereinafter sometimes abbreviated as "TBAHS") was used as the alkyl quaternary ammonium sulfate (hereinafter, sometimes abbreviated as "raw material 2").

The resulting polyvinylidene fluoride resin composition was sandwiched between aluminum foils, further sandwiched between stainless steel (SUS) plates, and pressed at 200° C. for 5 minutes under a pressure of 5 MPa, using a compression molding machine (Model AYSR-5, available from Shinto Metal Industries, Ltd.). The pressed product was then immediately cooled (quenched) with a cold press at 30° C. for 3 minutes while the pressed product was sandwiched between the SUS plates. In this way, a molded article 1 having a sheet shape was produced. The thickness of the molded article 1 was measured five times per sample using a thickness gauge "DG-925" (available from Ono Sokki Co., Ltd.) to determine an average value. This average value is taken as the thickness of the molded article 1. The thickness of the molded article 1 was 2.0 mm.

Example 2

A polyvinylidene fluoride resin composition was produced in the same manner as in Example 1 with the exception that the raw material 1 was changed to Solef 6010/1001 available from Solvay, which is a powdery homopolymer, to produce a molded article 2 having a thickness of 2 mm.

Example 3

A polyvinylidene fluoride resin composition was produced in the same manner as in Example 1 with the exception that the raw material 1 was changed to FR907 available from Shanghai 3F New Materials Co., Ltd., which is a powdery homopolymer, to produce a molded article 3 having a thickness of 2 mm.

Example 4

A polyvinylidene fluoride resin composition was produced in the same manner as in Example 1 with the exception that the raw material 2 was changed to tetraethylammonium hydrogen sulfate (available from Tokyo Chemical Industry Co., Ltd., hereinafter sometimes abbreviated as "TEAHS") to produce a molded article 4 having a thickness of 2 mm.

Example 5

A polyvinylidene fluoride resin composition was produced in the same manner as in Example 1 with the exception that the raw material 2 was changed to tetrapropylammonium hydrogen sulfate (available from Sigma-Aldrich Co. LLC, hereinafter sometimes abbreviated as "TPAHS") to produce a molded article 5 having a thickness of 2 mm.

Example 6

A polyvinylidene fluoride resin composition was produced in the same manner as in Example 1 with the exception that an added amount of the raw material 2 was changed from 1.0 part by weight to 0.8 parts by weight to produce a molded article 6 having a thickness of 2 mm.

Example 7

A polyvinylidene fluoride resin composition was produced in the same manner as in Example 1 with the exception that the added amount of the raw material 2 was changed from 1.0 part by weight to 3.0 parts by weight to produce a molded article 7 having a thickness of 2 mm.

Example 8

A polyvinylidene fluoride resin composition was produced in the same manner as in Example 1 with the exception that the added amount of the raw material 2 was changed from 1.0 part by weight to 5.0 parts by weight to produce a molded article 8 having a thickness of 2 mm.

Comparative Example 1

A polyvinylidene fluoride resin composition was produced in the same manner as in Example 1 with the exception that the raw material 1 was changed to KF #1000 available from Kureha Corporation, which is a powdery homopolymer, to produce a molded article C1 having a thickness of 2 mm.

Comparative Example 2

A polyvinylidene fluoride resin composition was produced in the same manner as in Example 1 with the exception that the raw material 1 was changed to KF #2300 available from Kureha Corporation, which is a powdery copolymer, to produce a molded article C2 having a thickness of 2 mm.

Comparative Example 3

A polyvinylidene fluoride resin composition was produced in the same manner as in Example 1 with the exception that the raw material 1 was changed to Kynar (trade name) 1000HD available from Alkema S.A., which is a pellet-shaped homopolymer, to produce a molded article C3 having a thickness of 2 mm.

Comparative Example 4

A polyvinylidene fluoride resin composition was produced in the same manner as in Example 1 with the exception that the raw material 1 was changed to Kynar (trade name) 740 available from Alkema S.A., which is a pellet-shaped homopolymer, to produce a molded article C4 having a thickness of 2 mm.

Comparative Example 5

A polyvinylidene fluoride resin composition was produced in the same manner as in Example 1 with the exception that potassium chloride (KCl) was added so as to be 0.2 parts by weight as a raw material 3 to produce a molded article C5 having a thickness of 2 mm.

Comparative Example 6

A polyvinylidene fluoride resin composition was produced in the same manner as in Example 1 with the exception that 0.5 parts by weight of MEGAFACE (trade name) F114 available from DIC Corporation was added as the raw material 3 to produce a molded article C6 having a thickness of 2 mm.

Comparative Example 7

A polyvinylidene fluoride resin composition was produced in the same manner as in Example 1 with the exception that the raw material 1 was changed to Kynar (trade name) 2800-00 available from Alkema S.A., which is a pellet-shaped copolymer, to produce a molded article C7 having a thickness of 2 mm.

Details of the raw materials 1 used in Examples 1 to 8 and Comparative Examples 1 to 7 are shown in Table 1 and details of the raw materials 2 and 3 are shown.

EVALUATION (Hydrogen Fluoride Concentration of Raw Material 1)

10 g of the raw material 1 was added to 50 g of a solution consisting of 50 wt. % methanol and 50 wt. % ion exchanged water, and was left for one week at room temperature. Fluoride ions ($F^-$) that flowed out into the solution were quantified by ion chromatography. Then, a hydrogen fluoride concentration was obtained by (concentration of fluoride ions in solution)×(weight of solution)/(weight of raw material 1). The results are shown in Table 1.

(Alkali Metal Concentration of Resin Composition)

The resin composition obtained in each of Examples 1 to 8 and Comparative Examples 1 to 7 was heated and subjected to ashing. The resin composition subjected to ashing was then dissolved in an acid, and measured by inductively coupled plasma emission spectroscopy (ICP-AES) to obtain the alkali metal concentration (sodium concentration or potassium concentration). The results are shown in Table 3. In Table 3, "N. D" indicates that no sodium or potassium concentration was detected.

(Haze)

The haze (%) was measured for each of the molded articles 1 to 8 and C1 to C7.

The haze of each of the molded articles was measured using a haze meter "NDH4000" (available from Nippon Denshoku Industries Co., Ltd.) in accordance with JIS K7136. The results are shown in Table 3.

(Melting Point and Crystal Melting Enthalpy)

For each of the molded articles 1 to 8 and C1 to C7, the melting point and the crystal melting enthalpy ΔH of the molded article were measured. A differential scanning calorimeter (DSC-1) (available from Mettler-Toledo International Inc.) was used for these measurements. The measurement was performed while raising temperature from 30° C. to 230° C. at 10° C./minute.

The melting point (° C.) of the molded article was determined as the temperature of the peak top in the crystal melting peak observed in the temperature raising process. The crystal melting enthalpy ΔH (J/g) was calculated from an area of the crystal melting peak. The results are shown in Table 3.

TABLE 1

| | Raw material 1 | | | | |
|---|---|---|---|---|---|
| | Product No. | Shape | Polymerization method | Homopolymer/ copolymer | Hydrogen fluoride concentration (ppm) |
| Example 1 | Polymer A | Powder | Suspension Polymerization | Homopolymer | 0.15 |
| Example 2 | Solef 6010/1001 | Powder | Suspension Polymerization | Homopolymer | 0.4 |
| Example 3 | FR907 | Powder | Emulsion Polymerization | Homopolymer | 0.3 |
| Example 4 | Polymer A | Powder | Suspension Polymerization | Homopolymer | 0.15 |
| Example 5 | Polymer A | Powder | Suspension Polymerization | Homopolymer | 0.15 |
| Example 6 | Polymer A | Powder | Suspension Polymerization | Homopolymer | 0.15 |
| Example 7 | Polymer A | Powder | Suspension Polymerization | Homopolymer | 0.15 |
| Example 8 | Polymer A | Powder | Suspension Polymerization | Homopolymer | 0.15 |
| Comparative Example 1 | KF#1000 | Powder | Suspension Polymerization | Homopolymer | 9.4 |
| Comparative Example 2 | KF#2300 | Powder | Suspension Polymerization | Copolymer | 7.2 |

TABLE 1-continued

| | Raw material 1 | | | | |
|---|---|---|---|---|---|
| | Product No. | Shape | Polymerization method | Homopolymer/ copolymer | Hydrogen fluoride concentration (ppm) |
| Comparative Example 3 | Kynar 1000HD | Pellet | Emulsion Polymerization | Homopolymer | 0.15 |
| Comparative Example 4 | Kynar 740 | Pellet | Emulsion Polymerization | Homopolymer | 0.05 |
| Comparative Example 5 | Polymer A | Powder | Suspension Polymerization | Homopolymer | 0.15 |
| Comparative Example 6 | Polymer A | Powder | Suspension Polymerization | Homopolymer | 0.15 |
| Comparative Example 7 | Kynar 2800-00 | Pellet | Emulsion Polymerization | Copolymer | 1.9 |

TABLE 2

| | Raw material 2 | | Raw material 3 | |
|---|---|---|---|---|
| | Type | Compounded amount (parts by weight) | Type | Compounded amount |
| Example 1 | TBAHS | 1.0 | — | — |
| Example 2 | TBAHS | 1.0 | — | — |
| Example 3 | TBAHS | 1.0 | — | — |
| Example 4 | TEAHS | 1.0 | — | — |
| Example 5 | TPAHS | 1.0 | — | — |
| Example 6 | TBAHS | 0.8 | — | — |
| Example 7 | TBAHS | 3.0 | — | — |
| Example 8 | TBAHS | 5.0 | — | — |
| Comparative Example 1 | TBAHS | 1.0 | — | — |
| Comparative Example 2 | TBAHS | 1.0 | — | — |
| Comparative Example 3 | TBAHS | 1.0 | — | — |
| Comparative Example 4 | TBAHS | 1.0 | — | — |
| Comparative Example 5 | TBAHS | 1.0 | KCl | 0.2 parts by weight |
| Comparative Example 6 | TBAHS | 1.0 | MEGAFACE F114 | 0.5 parts by weight |
| Comparative Example 7 | TBAHS | 1.0 | — | — |

TABLE 3

| | Resin composition | | | Molded article | | | |
|---|---|---|---|---|---|---|---|
| | Na concentration (ppm) | K concentration (ppm) | Na + K concentration (ppm) | Thickness (mm) | Haze (%) | Melting point (° C.) | ΔH [J/g] |
| Example 1 | N.D | N.D | N.D | 2 | 16.3 | 172 | 56 |
| Example 2 | N.D | N.D | N.D | 2 | 19.9 | 176 | 59 |
| Example 3 | 2.1 | N.D | 2.1 | 2 | 16.2 | 171 | 57 |
| Example 4 | N.D | N.D | N.D | 2 | 20.4 | 171 | 55 |
| Example 5 | N.D | N.D | N.D | 2 | 16.1 | 173 | 56 |
| Example 6 | N.D | N.D | N.D | 2 | 23.9 | 174 | 55 |
| Example 7 | N.D | N.D | N.D | 2 | 12.3 | 173 | 56 |
| Example 8 | N.D | N.D | N.D | 2 | 13.0 | 173 | 55 |
| Comparative Example 1 | 2.2 | N.D | 2.2 | 2 | 25.5 | 175 | 56 |
| Comparative Example 2 | 1.9 | N.D | 1.9 | 2 | 29.5 | 159 | 35 |
| Comparative Example 3 | 152 | 75.3 | 227.3 | 2 | 29.6 | 173 | 57 |
| Comparative Example 4 | 153 | 83.9 | 236.9 | 2 | 33.1 | 172 | 57 |
| Comparative Example 5 | 4.3 | 360 | 364.3 | 2 | 67.6 | 174 | 52 |
| Comparative Example 6 | 1.4 | 348 | 349.4 | 2 | 67.1 | 174 | 52 |
| Comparative Example 7 | 39.9 | 26.5 | 66.4 | 2 | 28.3 | 177 | 64 |

[Results]

As shown in Table 3, the molded articles 1 to 8 obtained in Examples 1 to 8 had a lower haze and higher transparency than the molded articles C1 to C7 obtained in Comparative Examples 1 to 7. This is thought to be because the concentrations of hydrogen fluoride and alkali metal that inhibit the expression of transparency of the molded articles were low.

It is thought that the hydrogen fluoride concentration of the raw material 1 used in each of Comparative Examples 1 and 2 was high, and TBAHS that contributes to transparency was consumed by a reaction between TBAHS and hydrogen fluoride, resulting in poor transparency of the molded articles C1 and C2.

The hydrogen fluoride concentration of the raw material 1 used in each of Comparative Examples 3 and 4 was equivalent to the hydrogen fluoride concentration of the raw material 1 used in each of Examples. On the other hand, the alkali metal concentration in the resin composition obtained in each of Comparative Examples 3 and 4 was higher than the alkali metal concentration of the resin composition obtained in each of Examples. It is thought that the presence of excess alkali metal inhibits the ionic interaction between TBAHS and the polyvinylidene fluoride, resulting in poor transparency of the molded article.

In each of Comparative Examples 5 and 6, the alkali metal concentration in the resin composition was higher than that of the resin composition of each of Examples by adding KCl or MEGAFACE (trade name) F114, which is a fluorine-based surfactant, as the raw material 3. It is thought that the presence of excess alkali metal inhibits the ionic interaction between TBAHS and the polyvinylidene fluoride, resulting in poor transparency of the molded article.

The hydrogen fluoride concentration of the raw material 1 used in Comparative Example 7 was higher than the hydrogen fluoride concentration of the raw material 1 used in each of Examples. Furthermore, the alkali metal concentration in the resin composition obtained in Comparative Example 7 was higher than the alkali metal concentration of the resin composition obtained in each of Examples. It is thought that the transparency of the molded article was deteriorated due to the high concentrations of hydrogen fluoride and alkali metal that inhibit the expression of transparency of the molded article.

INDUSTRIAL APPLICABILITY

The present invention can be utilized in highly transparent members such as optical members.

The invention claimed is:

1. A polyvinylidene fluoride resin composition comprising a polyvinylidene fluoride, the polyvinylidene fluoride resin composition comprising
   an alkyl quaternary ammonium sulfate,
   an alkali metal concentration in the polyvinylidene fluoride resin composition being 2.1 ppm or less, and
   a hydrogen fluoride concentration in the polyvinylidene fluoride being 0.15 ppm or more and 1 ppm or less.

2. The polyvinylidene fluoride resin composition according to claim 1, wherein a crystal melting enthalpy measured by a differential scanning calorimeter is 40 J/g or greater and 80 J/g or less.

3. The polyvinylidene fluoride resin composition according to claim 1, wherein the polyvinylidene fluoride is a homopolymer of vinylidene fluoride.

4. The polyvinylidene fluoride resin composition according to claim 1, wherein the alkyl quaternary ammonium sulfate is an alkyl quaternary ammonium hydrogen sulfate.

5. The polyvinylidene fluoride resin composition according to claim 4, wherein the alkyl quaternary ammonium hydrogen sulfate is at least one selected from tetraethylammonium hydrogen sulfate, tetrapropylammonium hydrogen sulfate, and tetrabutylammonium hydrogen sulfate.

6. A molded article having a thickness of 1 mm or greater, the molded article being molded from the polyvinylidene fluoride resin composition described in claim 1, and a haze of the molded article being 25% or less.

* * * * *